United States Patent
Lowe et al.

(10) Patent No.: US 6,607,655 B1
(45) Date of Patent: Aug. 19, 2003

(54) REACTOR AND METHOD FOR CARRYING OUT ELECTROCHEMICAL REACTIONS

(75) Inventors: Holger Lowe, Oppenheim (DE); Michael Kupper, Mainz (DE); Athanassios Ziogas, Mainz (DE)

(73) Assignee: Institut fur Mikrotechnik Mainz GmbH, Mainz (DE)

(*) Notice: Subject to any disclaimer, the term of this patent is extended or adjusted under 35 U.S.C. 154(b) by 0 days.

(21) Appl. No.: 09/787,059

(22) PCT Filed: Sep. 10, 1999

(86) PCT No.: PCT/EP99/06684
§ 371 (c)(1),
(2), (4) Date: Jan. 7, 2002

(87) PCT Pub. No.: WO00/15872
PCT Pub. Date: Mar. 23, 2000

(30) Foreign Application Priority Data
Sep. 10, 1998 (DE) .......................... 198 41 302

(51) Int. Cl.⁷ .................. C25C 3/00; C25B 3/00; C25B 1/00; C25B 3/02; C25D 17/00
(52) U.S. Cl. .................. 205/334; 205/413; 205/464; 205/449; 204/242; 204/252; 204/275.1; 204/263; 429/130
(58) Field of Search ................. 204/242, 252, 204/275.1, 263; 205/413, 464, 449, 334

(56) References Cited

U.S. PATENT DOCUMENTS

| | | | |
|---|---|---|---|
| 3,657,099 A | * 4/1972 | Seko et al. | 204/253 |
| 4,406,768 A | 9/1983 | King | 204/268 |
| 5,956,562 A | * 9/1999 | Lo et al. | 422/186.2 |
| 6,045,677 A | * 4/2000 | Beetz, Jr. et al. | 205/50 |
| 6,180,906 B1 | * 1/2001 | Trainoff | 209/127.1 |

FOREIGN PATENT DOCUMENTS

| | | |
|---|---|---|
| DE | 2 022 696 | 11/1970 |
| DE | 2502840 | 7/1976 |
| DE | 25 55 958 | 6/1977 |
| DE | 28 48 397 | 5/1980 |
| EP | 0582192 | 2/1994 |
| FR | 2298615 | 8/1976 |

OTHER PUBLICATIONS

F. Beck and H. Guthke, in Chemie–Ingenieur–Technik, Issue 17, 1969, 41 $^{st}$ year, pp. 943–950, month unavailable.

* cited by examiner

*Primary Examiner*—Edna Wong
(74) *Attorney, Agent, or Firm*—Hudak, Shunk & Farine Co., LPA

(57) ABSTRACT

Reactor for carrying out electrochemical reactions with an electrode and a counter-electrode are known, whereby the electrodes are separated form one another by a capillary gap. Such reactors do not comprise a homogeneous flow rate distribution in the capillary gap which can thus lead to a reduction of selectivity and of local temperature increases. In addition, high ohmic resistance requires the use of conducting salts. The aim of the invention is to provide a reactor in which the voltage drop in the electrolyte is minimized and which can be better optimized over a short resistance time distribution. To this end, the capillary gap comprises at least one channel as a reaction chamber having a height less than or equal to 200 μm. According to the inventive method, the volume flow of the educt current is measured such that the flow of the educt current is laminar over the length of the channel having a height less than or equal to 200 μm.

25 Claims, 4 Drawing Sheets

REACTOR AND METHOD FOR CARRYING OUT ELECTROCHEMICAL REACTIONS

BACKGROUND OF THE INVENTION

The invention involves a reactor and a method for carrying out electrochemical reactions.

Capillary gap cells in which the electrolyte flows parallel to the surface of the closely spaced electrodes are known for use in organic syntheses in solutions with low electrolytic conductivity. F. Beck and H. Guthke, in Chemie-Ingenieur-Technik, Issue 17, 1969, 41st year, Pages 943–950, describe a capillary gap cell for acrylonitrile electrolysis. Between two circular electrodes are located circular plates parallel to one another that are connected in a bipolar series. Radially arranged strips made of polyester foil maintain a distance of 125 m between the plates. The reaction mixture flows through the horizontal capillary gaps, trickles down the outside of the stack of electrodes and is routed into a cooler.

In DE-OS-25 55 958 a capillary gap cell is presented in which laminar flow conditions are employed to suppress back diffusion of electrolyte products to the counter-electrode. A high level of selectivity is achieved with these laminar conditions in conjunction with an adaptation to volumetric flow and current conduction under limitation to mean conversion, without the use of a diaphragm. A cylindrical capillary gap cell according to Beck is used as the electrolytic cell.

A counter-electrode with grooves, with the bottom of grooves exhibiting an insulating layer, is suggested to ensure that the controlled diffusion is not impaired in the course of gas-evolving, electrolytic reactions.

Laminar flow is achieved using the capillary cells constructed using cylindrical plates according to Beck only on planes that are perpendicular to the surface of the electrode due to the low height of the capillary gap (normally <1 mm). This can be sufficient for preventing back diffusion of electrolysis products from the electrode to the counter-electrode.

However, on levels parallel to the surface of the electrode laminar flow and, hence, homogeneous flow rate distribution is not achieved owing to a lack of lateral guides. The volume available to the educt current increases as the educt flows radially from the center of the circular plates toward the outside, resulting in a decrease in the flow rate distribution and in creation of transverse flows. In regions with markedly slower flow rates, so-called dead water regions, the retention time of the educt and products increases with respect to more rapidly flowing regions, which can result in a reduction of selectivity of the reaction. Owing to this inhomogeneity of the flow rate distribution, optimization with regard to selectivity and yield from a reaction is limited. In addition, temperature increases may occur in regions of slower flow rates due to the reduced heat removal with this, in turn, resulting in a further reduction of selectivity.

In DE-OL 20 22 696 an electrolytic cell for production of adipic dinitrile is described. The electrolytic cell comprises an anode plate consisting of one or two sets, a cathode plate, a membrane situated between the two plates and channels formed between each plate and membrane. The channels possess a reversing section for meandering redirection of the flow, with the reversing section being located outside of the space between the anode and the cathode that emits an electrical field. This arrangement allows an electrolyte channel that is substantially longer that the length of one side of the electrode to be maintained over the entire length. The channel is formed by a spacer made of insulating material and is limited from the top and from the bottom by the membrane, or by the electrode plate. The channel has a width of 0.5 to 50 cm 25 and a height of 0.5 to 5 mm.

As opposed to the cells described previously, this electrolytic cell allows work to be performed under laminar flow conditions on account of the channel. However, laminar flow conditions are present only in a limited region of the volumetric flow for the values given here for the width and height of the channel, in particular in conjunction with the reversing sections. In addition, this electrolytic cell also requires the use of conducting salt for reducing the ohmic resistance. This is accompanied by ohmic thermal losses, with the associated reduction of selectivity and yield, and complicated separation of the conducting salt from the desired product.

SUMMARY OF THE INVENTION

The invention is therefore based on the task of presenting a reactor of the type mentioned previously, with which it is possible to minimize the voltage loss in electrolytes without, or with very limited use of a conducting salt and with which a close retention time distribution of the educts and products and, hence, a high level of optimization of the reaction conditions is obtained with regard to selectivity and yield. In addition, the invention also has the task of providing a procedure as described previously that exhibits the advantages cited.

This task is fulfilled using a reactor with which the capillary gap that separates the electrodes from one another exhibits a channel with a height less than or equal to 200 $\mu$m as the reaction space.

This channel, which acts as the lateral guide for the educt current, also permits laminar flow conditions on planes parallel to the surface of the electrodes, whereas upper and lower limiting alone by the capillary gap based on the capillary gap cell by Beck favors laminar flow conditions only in planes perpendicular to the surface of the electrode. The selection of a channel height that is less than or equal to 200 $\mu$m allows laminar flow conditions and, hence, homogenous flow rate distribution in the channel to be achieved in a broad volumetric flow range over the entire cross section of the channel.

This permits precise and reproducible controllability of the retention time for the educt and products over a wide range of volumetric flow rates. This, in turn, enables optimization of the reaction parameters in wide ranges with respect to enhanced selectivity and yield of the reactions involved.

Based on the height of the channel and, thus, of the distance between the electrodes being less than or equal to 200 $\mu$m, the diffusion layers of the anode and cathode, which lie within the range of around 100 $\mu$m, overlap. Consequently, the percentage of electrolyte for the overall resistance is eliminated. The overall resistance therefore consists essentially only of the resistance for the diffusion layers of the anode and cathode, meaning that a low ohmic resistance is achieved without, or only with limited use of a conducting salt. This represents a significant advantage in particular for systems with low electrolytic conductivity, for example for electro-organic synthesis. Consequently, ohmic resistance losses and, hence, occurrence of undesired side or secondary reactions can be reduced advantageously. In addition, only slight amounts of conductive salts, or no conductive salts at all, need to be separated from the product solution. On the whole, electrochemical synthesis can therefore be carried out more economically using the reactor in accordance with the invention.

Preferably, the reactor capillary gap has a height less than or equal to 150 µm, especially preferred is a height from 1 to 100 µm. The especially preferred design is of particular benefit for electro-organic syntheses with very low electrolytic conductivity.

The capillary gap can also exhibit several channels having a height less than or equal to 200 µm. The channels advantageously have identical dimensions in order also achieve a homogeneous flow rate distribution over the individual channels.

In addition to straight channels, arched or meandering channels are also well suited, with a compact design of the reactor being obtained in comparison with the channel lengths.

Channels with widths less than or equal to 10 mm are advantageous for lateral guidance of the educt current and/or of the educt currents; preferred are widths of 5 µm to 1 mm. It is likewise preferred that the channel cross section be kept the same over the length of the channel in order that the same flow rate distribution is obtained for the entire length of the channel.

It is advantageous for achieving laminar flow conditions when the channel, or channels, preferably have a width b to length l ratio of less than 1:5, with a ratio less than 1:50 being preferred.

Based on a further design, an insulation layer is arranged in the capillary gap between the electrodes, with this layer bordering advantageously on both electrode surfaces. This insulation layer is provided with a recess, or several recesses, to allow the creation of a channel or channels. Each recess is connected with an electrode and the counter-electrode and with structures for supply of educt and removal of products.

In accordance with the preferred design, the insulating layer is an insulating foil whose thickness corresponds to the thickness of the capillary gap. The foil is provided with a recess, or several recesses, to allow the creation of a channel or channels.

It is advantageous when at least one electrode is provided with structures in the form of recesses which serve for supply and removal of the electrolytes to and from the channel. These structures are dimensioned advantageously such that a uniform flow rate distribution can be achieved below the channels.

At least one electrode has a flat surface in the region of the channel or channels of the capillary gap. It can also be advantageous, however, for at least one electrode to be provided with a groove in each region of the channel or channels of the capillary gap to achieve different current densities at the electrode and at the counter-electrode.

Based on a preferred design, the reaction space for the reactor in accordance with the invention is designed as a non-divided electrolytic cell.

In accordance with a further design, the capillary gap possesses a diaphragm between the electrodes. At least one channel is located between the diaphragm and at least one electrode. It is advantageous when each of the two spaces between the diaphragm and the two electrodes has at least one channel that functions as a reaction space.

It is advantageous when the diaphragm forms the insulation layer. In addition, it is also an advantage when the diaphragm possesses a groove on one or two sides for formation of the channel, or channels. To this end, the diaphragm is formed advantageously by a single-piece microstructure body made of an ion-conducting polymer.

It is advantageous to have at least one moderating element, for example a heat exchanger or Peltier element, thermally connected to at least one electrode to permit specific control of the reaction temperature. Moderation via the electrode is of advantage owing to the thermal conductivity linked with electrical conductivity and to the contact with the electrolyte. Due to their narrow width, the channels have a high surface to volume ratio that enables rapid heat transfer with the creation of regions with markedly differing temperatures.

It is particularly advantageous when at least one electrode is a moderating element.

The reactor in accordance with the invention is particularly well suited for carrying out electrochemical reactions in parallel. For this, a capillary gap is provided with several grooves and/or several plate-shaped electrodes are arranged essentially parallel to one another, with each one being separated by a capillary gap having at least one channel. It is advantageous when moderating elements are integrated into this stack of electrodes, for example in a manner such that a capillary gap and a moderating element are arranged between alternate, consecutive electrodes.

In accordance with a further design, a counter-electrode is arranged opposite the two sides of a plate-shaped electrode.

A moderating element is preferably arranged between two electrodes that do not form a capillary gap, or at least one electrode being designed as a moderating element.

In accordance with the procedure based on the invention for conducting electrochemical reactions in a reactor, the educt current is routed through at least one channel present in the capillary gap. This channel serves as a reaction space and has a height less than or equal to 200 µm. Here, the volumetric flow of the educt current is dimensioned such that the flow of the educt current over the length of the channel is laminar. The reactor used possesses at least one electrode and a counter-electrode which are separated by a capillary gap.

In addition to the volumetric flow of the educt current, it is also advantageous when the geometry of the channel is selected such as to ensure that the educt current is laminar over a wide range of the volumetric flow over the length of the channel.

In accordance with a further design, the educt current is split up into several component currents. The component currents are each routed in a channel in the capillary gap that serves as a reaction space and whose height is less than or equal to 200 µm. The volumetric flow for the educt current is dimensioned such that the flow for each component current is laminar. It is advantageous when the dimensions and shape of the channels are selected so as to ensure that the volumetric flows for the component currents are of the same magnitude. This can be achieved by having identical channel lengths and identical channel cross-sections.

It is advantageous when electrochemical reactions are conducted in accordance with this procedure without the use of conducting salt. This is enabled employing channels in a capillary gap with a height less than or equal to 200 µm, preferably with a height less than or equal to 150 µm, and especially preferred with a height within the range of 1 to 100 µm. Consequently, use of some very expensive conducting salts, and the complicated procedure involved in separating these salts from the product, can be substantially reduced or even omitted.

In accordance with this procedure it is advantageous when at least one reactor in accordance with the invention is used. When several reactors are used, these are preferably connected in parallel by fluids so that an increase in, the material reaction can be achieved when required. A decisive advantage here is the capability of retaining optimized reaction parameters in a single reactor. There is no costly transfer of this procedure, with the associated considerable risks, from the scale used in the laboratory to industrial-scale production required. This procedure also permits electrochemical reactions be conducted in a single reactor on a small scale, for example for materials research.

A preferred electrochemical reaction in accordance with this procedure is the oxidation of methylbenzene substituted in the $4^{th}$ place to benzaldehyde or benzaldehyde acetal while retaining the substituents in the $4^{th}$ place.

These benzaldehydes and/or benzaldehyde acetals, which are to be converted to one another using known procedures, represent preliminary products for additives, flavors and perfumes. An especially preferred reaction in this case is the oxidation of 4 methoxymethylbenzene to 4 methoxybenzaldehyde with methanol present as the carrier and potassium fluoride as the conducting salt with a concentration of 0 to 0.1 mol/l.

The reactor in accordance with the invention, and the process, are well suited for conducting electrochemical reactions, in particular for organic compounds, with a very close retention time distribution being achieved owing to the laminar flow conditions prevalent in the channel that serves as the reaction space. This, in turn, allows the reaction conditions to be optimized extremely precisely. As a result, it is possible to enhance selectivity and the yield from the electrochemical reactions.

DETAILED DESCRIPTION OF THE INVENTION

Figure 1A:
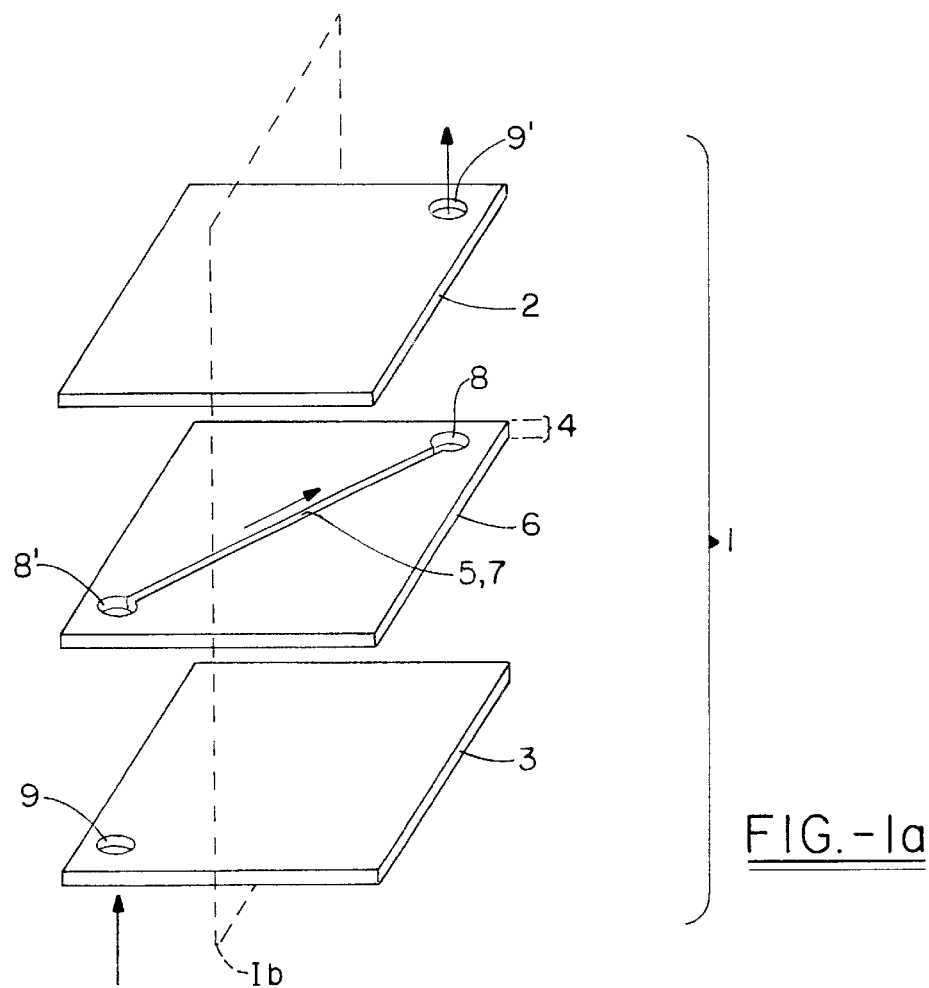
FIG. 1a Electrode and counter-electrode, together with an insulating foil with one slot in perspective view, FIG. 1b The reactor as per FIG. 1a, cross section, side view FIG. 2a Electrode and counter-electrode, a slotted insulating foil (several slots) in perspective view FIG. 2b The reactor as per FIG. 2a, cross section, side view, cross section through the region of the channels, FIG. 2c The reactor as per FIG. 2a, cross section, side view, cross section through the region of the fluid inlet supply, FIG. 3 A reactor with an electrode provided with grooves, cross section, side view, FIG. 4 A reactor with several electrodes arranged parallel to one another, cross section, side view, FIG. 5 A reactor with a diaphragm arranged between two insulating foils, cross section, side view, FIG. 6 A reactor with insulating foil, diaphragm and a grooved electrode, cross section, side view, FIG. 7 A reactor with diaphragm and two grooved electrodes, cross section, side view, FIG. 8 A reactor with a diaphragm with grooves on both sides, cross section, side view.
Figure 1B:
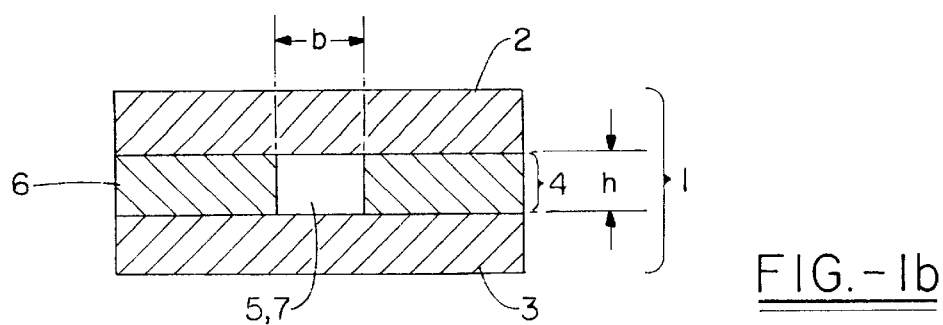

The reactor 1 shown as a schematic diagram in FIG. 1a and 1b is provided with an electrode 2 and a counter-electrode 3 which are both designed as plates with flat surfaces and which are parallel to one another and separated only by a capillary gap 4. A perspective view of the separated components of the reactors is shown in FIG. 1a. In the capillary gap 4 an insulating foil 6 is arranged, which serves simultaneously as a spacer between the two electrodes 2, 3. There are holes 8, 8' in the foil that are connected by a slot 7 that is open to both sides of the foil 6. The slot 7 is covered by the two electrodes 2, 3, thus forming a channel 5. Inlet supply of the fluid is via hole 9 in electrode 3 and fluid removal via a hole 9' in electrode 2, with holes 9, 9' being linked to holes 8, 8' in the insulating foil 6.

An educt current routed through channel 5 exhibits laminar flow conditions by being limited not only in height h, with h less than or equal to 200 $\mu$m, by the two electrodes 2, 3, but also in width b by the walls of slot 7 in the insulating foil 6. As a result of the channel structure, the reaction space does not possess any regions where transverse flow or dead-water zones occur. The retention time for the educt that is routed through the channel can therefore be controlled.

Figure 2A:
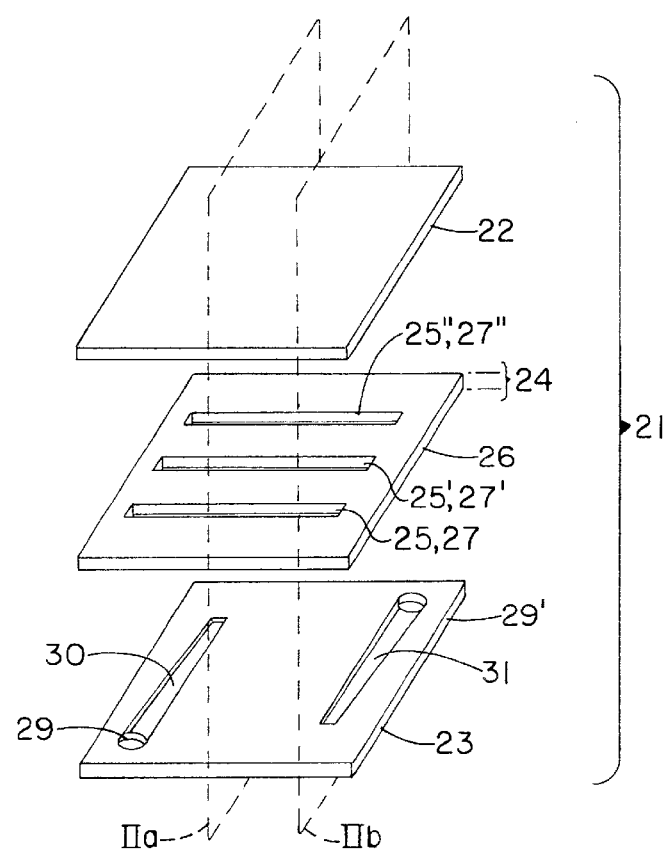
Figure 2B:
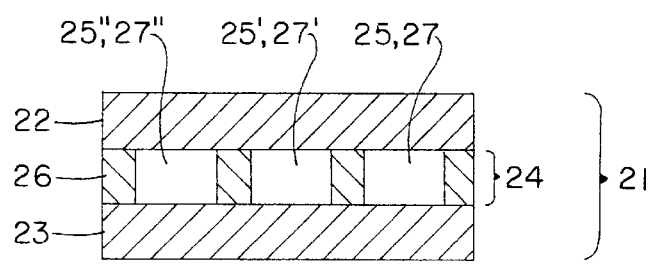
Figure 2C:
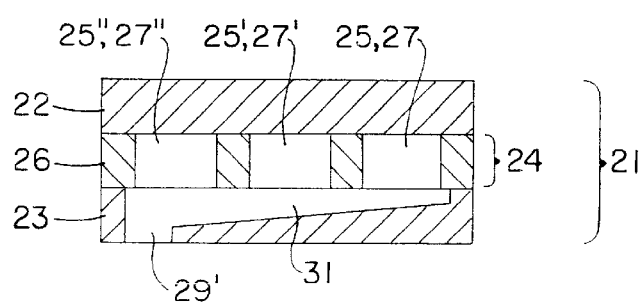

The schematic diagram of reactor 21 shown in FIGS. 2a to 2c possesses a capillary gap 24 between the pair of electrodes 22, 23 in which three channels 25, 25', 25" are arranged as reaction spaces. These channels are in the form of slots 27, 27', 27" in an insulating foil 26 located between the electrodes 22, 23. Adjacent channels 25, 25', 25" do not have any fluid contact between one another. Groove-like structures 30 and 31, and holes 29, 29' that are linked to these structures, in the bottom electrode 23 are provided for supply and removal of fluid. In FIG. 2c a cross-sectional side view of the reactor in the region of hole 29' and structure 31 is presented. Structure 31 serves as a collector for the component currents flowing out of channels 25, 25', 25" and routes these currents to hole 29'.

This design permits a number of channel-shaped reaction spaces to be provided between two electrodes. The reaction space that is available is, thus, only slightly smaller than the known reactors whose capillary gap serves as the reaction space. It is these channels however, with a height less than or equal to 200 $\mu$m, that provide the means to promote laminar flow conditions with markedly reduced ohmic resistance and, hence, enhanced optimization for the reaction parameters.

Figure 3:
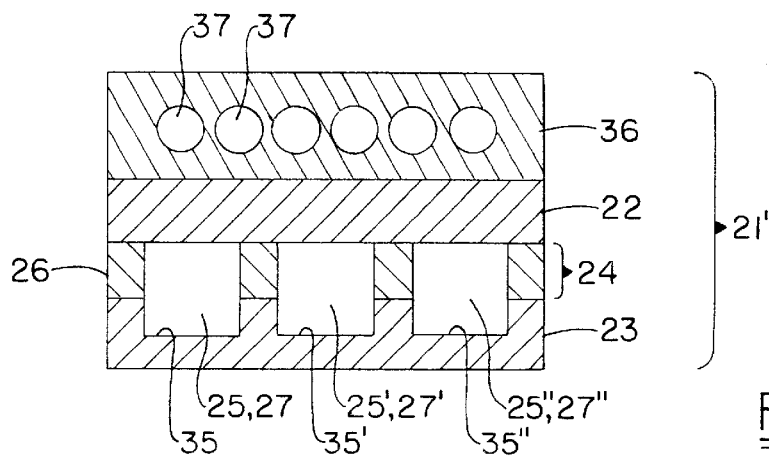

In contrast to the reactors shown in the preceding figures, the reactor 21' in FIG. 3 possesses a counter-electrode 23 provided with grooves 35, 35', 35". Electrode 22 and counter-electrode 23 are likewise separated by an insulating foil 26 with slots 27, 27', and 27".

The thusly formed channels 25, 25', 25", with a height less than or equal to 200 $\mu$m, are limited at the bottom by the grooves 35, 35', 35". As a result, each of the channels 25, 25', 25" that serves as a reaction space possesses a larger counter-electrode surface than the surface for the electrode 22. The different current densities that can be obtained in this manner at electrode 22 and at counter-electrode 23 can be applied specifically, for example, for precluding secondary reactions at the electrode.

In addition, reactor 21' possesses a moderating element 36 arranged on and thermally connected with electrode 22. Heating or cooling media can be routed through the holes 37.

Figure 4:
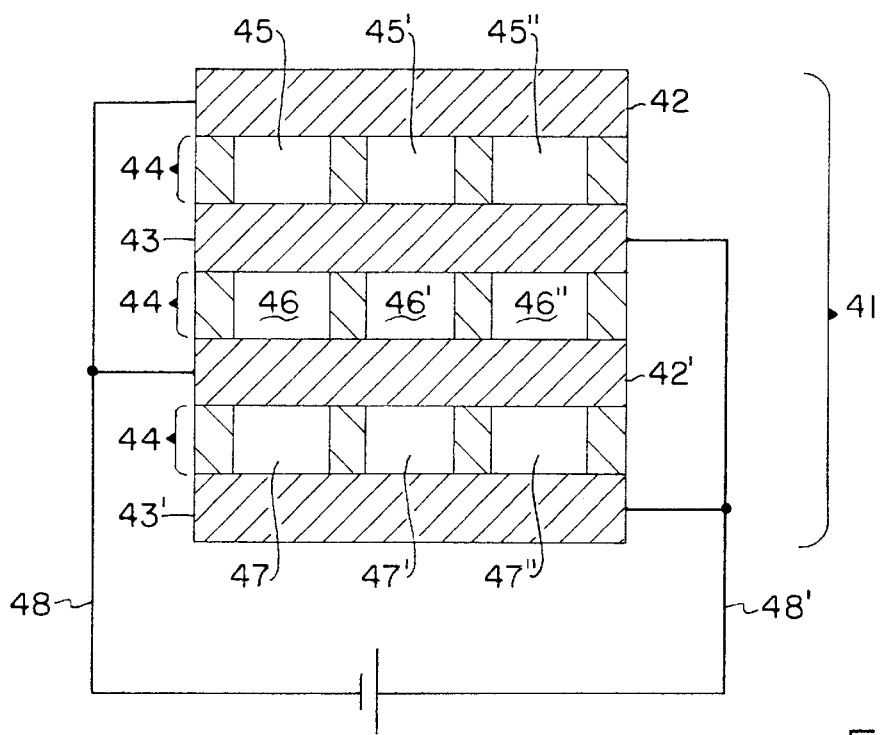

The use of several plate-shaped electrodes, each separated by a capillary gap possessing at least one channel with a height less than or equal to 200 $\mu$m, arranged parallel to one another allows a reactor with a particularly compact design to be obtained. An example of this design is the drawing in FIG. 4. Three capillary gaps 44, 44', 44", each possessing channels 45, 45',45", 46, 46', 46", 47, 47', 47", are located between four (4) electrodes 42, 43, 42', 43'. Thin plates, both sides of which serve as electrode surfaces, are used as electrodes 43, 42'. The center electrode 43 and the bottom electrode 43' are installed as the counter-electrodes to the two electrodes 42, 42', or to electrode 42'. The center electrodes 43, 42' may also be bipolar, with flow only to the two outer electrodes 42, 43' as the electrode or counter-electrode.

Whereas the preceding figures presented examples of designs with non-divided reaction spaces, the following figures refer to design examples with reaction spaces separated by a diaphragm.

Figure 5:
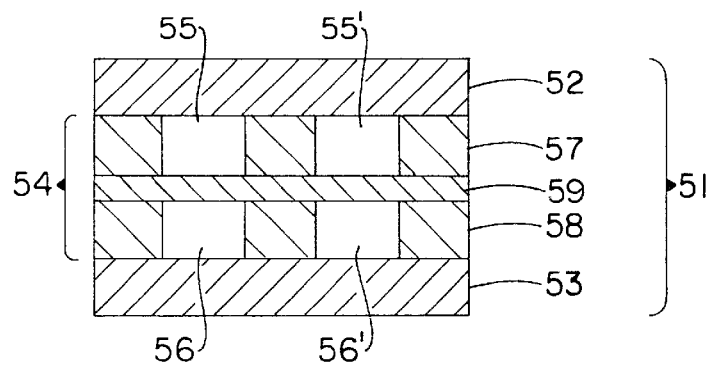

Reactor 51 as shown in FIG. 5 possesses a capillary gap 54 between the electrodes 52, 53 in which an ion-conducting foil that acts as the diaphragm 59 is located for separating the reaction spaces.

A slotted foil 57, 58 is located between the diaphragm 59 and each electrode 52, 53. As a result, there are channels 55, 55' and 56, 56', each having a height less than or equal to 200 $\mu$m, on both sides of the diaphragm 59. These channels serve as reaction spaces, with two channels each 55, 56 and 55' and 56' located opposite one another, separated only by the diaphragm 59.

Figure 6:
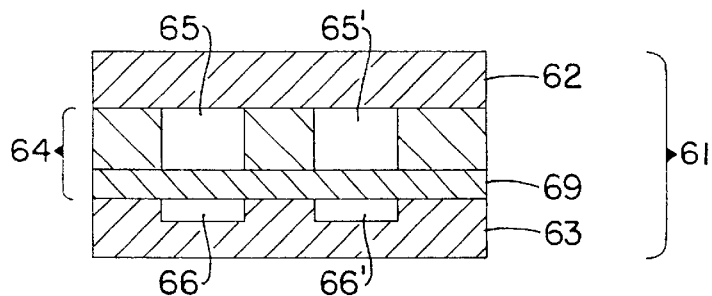

Based on the reactor 61. shown in FIG. 6, the channels 66, 66' located between the diaphragm 69 and the bottom electrode 63 are formed by grooves in the electrode surface. The channels 65, 65', located between the diaphragm 69 and the top electrode 62, are formed by slots in the insulating foil 67 (not shown). The insulating foil 67 and the diaphragm 69 are arranged in the capillary gap 64 between the two electrodes 62, 63.

Figure 7:
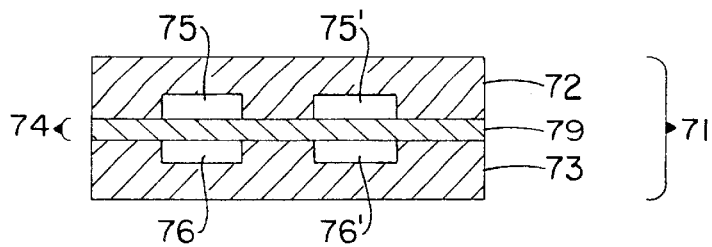

FIG. 7 shows a drawing of a reactor 71 that possesses only one diaphragm 79 in the capillary gap 74 between the two electrodes 72, 73. Grooves are provided on the surfaces of electrodes 72 and 73 for creating the channels 75, 75' and 76, 76'. The diaphragm serves as an insulating foil between the electrodes 72, 73 in the region of the lands between the grooves.

Figure 8:
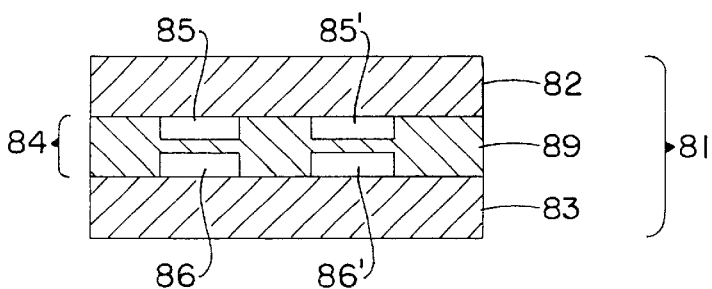

It is also possible, however, to provide a single-piece body 89 in the capillary gap 84 between the electrodes 82, 83 that can serve both as a diaphragm and as a grooved body for forming the channels 85, 85', 86, 86' having a height less than or equal to 200 m (FIG. 8). This would enable a very simple design for the reactor 81 consisting of plate-shaped electrodes 82, 83 with, for example, a microstructured body 89 either by injection molding or stamping, made of, for example, an ion-conducting polymer. This layered, modular design permits inexpensive production and maintenance of the reactor.

PROCESS EXAMPLE

In the following, the results of two reactions in two different reactors in accordance with the invention possessing channels with a height of 75 and 25 $\mu$m are presented based on electrochemical oxidation of 4 methoxymethylbenzene to 4 methoxybenzaldehyde, along with the published results obtained with a conventional reactor having a capillary gap of 500 $\mu$m for comparison.

A slotted insulating foil made of 75 $\mu$m-thick polyamide was installed in the first reactor in accordance with the invention, with a capillary gap having a height h=75 $\mu$m between two flat, plate-shaped electrodes, with the cathode being made of special steel and the anode of glass-carbon material. The parallel, straight slots had a width b=250 mm and a length l=45 mm. Supply and removal of the fluid was effected using structures in the electrodes. Heat removal was effected by the reactor enclosure.

The second reactor in accordance with the invention differed from the first reactor in that the height of its capillary gap was h=25 $\mu$m, the width of the channels b=800 $\mu$m and the length of the channels l=64 $\mu$m.

For the first reaction in the first reactor a 0.1 mol/l solution of 4 methoxymethylbenzene was fed into methanol containing 0.1 mol/l of potassium fluoride as a conducting salt with a volumetric flow rate of 0.1 ml/min per channel. The cell voltage applied between the electrodes was 4 to 10 V at a current density of 79 mA/cm$^2$. The second reaction with the second reactor was conducted using a 2.0 mol/l solution of 4 methoxymethylbenzene in methanol containing only 0.01 mol/l of potassium fluoride as the conducting salt, with the other reaction parameters being identical to the first reaction.

The content of the solution flowing out of the channels for the educt and the products (4 methoxybenzaldehyde and 4 methoxybenzaldehyde dimethylacetal) was examined by means of HPLC. The values for the reaction, calculated as a function of the reaction temperature for the measured values, for the educt and for the selectivity of the reaction and the yield for the products are listed in Table 1.

The comparison value given in Table 1 was taken from DE-OS 28 48 397 and is based on the same reaction, albeit in a conventional reactor with a capillary gap of 500 $\mu$m between graphite electrodes. A 0.7 mol/l solution of 4 methoxymethylbenzene in methanol containing 0.1 mol/l of potassium fluoride was given to the educt current. The product solution was then distilled. The values for the reaction and selectivity were calculated from the values given.

TABLE 1 electrochemical reaction of 4 methoxymethylbenzene

| No. | Temperature | Reaction | Selectivity | Yield |
|---|---|---|---|---|
| 1 | 20° C. | 96.8% | 98.8% | 95.6% |
| 2 | 50–60° C. | 94.5% | 89.7% | 73.2% |
| Comparison | 24–25° C. | approx. 98% | approx. 59% | 57.7% |

When the values for position 1 and 2 are compared to those obtained in the comparison experiment it becomes apparent that a substantial increase in the selectivity from 59% to nearly 99%/90% was able to be achieved over known processes using conventional reactors by applying the process in accordance with the invention using the reactor in accordance with the invention.

The procedure in accordance with the invention and the reactors described therein are also particularly advantageous for all of the electrochemical reactions cited in DE-OS 28 48 397.

| Legend | |
|---|---|
| 1 | Reactor |
| 2 | Electrode |
| 3 | Counter-electrode |
| 4 | Capillary gap |
| 5 | Channel |
| 6 | Insulating foil |
| 7 | Slot |
| 8, 8' | Hole |
| 9, 9' | Hole |
| 21, 21' | Reactor |
| 22 | Electrode |
| 23 | Counter-electrode |
| 24 | Capillary gap |
| 25, 25', 25" | Channel |
| 26 | Insulating foil |
| 27, 27', 27" | Slot |
| 29, 29' | Hole |

-continued

| Legend | |
|---|---|
| 30 | Supply distributor |
| 31 | Eduction distributor |
| 35, 35', 35" | Groove |
| 36 | Moderating element |
| 37 | Hole |
| 41 | Reactor |
| 42, 42' | Electrode |
| 43, 43' | Counter-electrode |
| 44, 44', 44" | Capillary gap |
| 45, 45', 45" | Channel |
| 46, 46', 46" | Channel |
| 47, 47', 47" | Channel |
| 48, 48' | Electrical feed lines |
| 51 | Reactor |
| 52 | Electrode |
| 53 | Counter-electrode |
| 54 | Capillary gap |
| 55, 55' | Channel |
| 56, 56' | Channel |
| 57 | Insulating foil |
| 58 | Insulating foil |
| 59 | Diaphragm |
| 61 | Reactor |
| 62 | Electrode |
| 63 | Electrode |
| 64 | Capillary gap |
| 65, 65' | Channel |
| 66, 66' | Channel |
| 67 | Insulating foil |
| 69 | Diaphragm |
| 71 | Reactor |
| 72 | Electrode |
| 73 | Counter-electrode |
| 74 | Capillary gap |
| 75, 75' | Channel |
| 76, 76' | Channel |
| 79 | Diaphragm |
| 81 | Reactor |
| 82 | Electrode |
| 83 | Counter-electrode |
| 84 | Capillary gap |
| 85, 85' | Groove |
| 86, 86' | Groove |
| 89 | Microstructured body |

What is claimed is:

1. A reactor for carrying out electrochemical reactions comprising:
at least one electrode and a counter-electrode, with the electrodes separated by a capillary gap, wherein the capillary gap has at least one channel with a height less than or equal to 200 $\mu$m and a width b that is less than or equal to 10 mm that serves as a reaction space for carrying out said electrochemical reactions, wherein an insulating layer is present in the capillary gap between the electrodes, with the insulating layer possessing a recess, or several recesses, or a slot, or several slots for forming or creating the at least one channel.

2. A reactor in accordance with claim 1, wherein the capillary gap has several channels with a height less than or equal to 200 $\mu$m.

3. A reactor in accordance with claim 1, wherein the capillary gap has a height of 1 to 100 $\mu$m.

4. A reactor in accordance with claim 1, wherein the channel, or channels, is straight or meandering.

5. A reactor in accordance with claim 1, wherein the channel, or channels, has a width b of 5 $\mu$m to 1 mm.

6. A reactor in accordance with claim 1, wherein the ratio of the width b to the length l of the channel, or channels, is less than 1:5.

7. A reactor in accordance with claim 6, wherein the ratio of the width b to the length l is less than 1:50.

8. A reactor in accordance with claim 1, wherein the cross section of the channel, or channels, remains essentially the same over the length of the channel(s).

9. A reactor in accordance with claim 1, wherein the insulating layer comprises an insulating foil.

10. A reactor in accordance with claim 1, wherein at least one electrode has recesses for fluid supply and/or fluid removal.

11. A reactor in accordance with claim 1, wherein at least one electrode has a flat surface in the region of the channel, or channels, of the capillary gap.

12. A reactor in accordance with claim 1, wherein at least one electrode has a groove in the region of the channel, or channels, of the capillary gap.

13. A reactor in accordance with claim 1, wherein the capillary gap between the electrodes further includes a diaphragm, with at least one channel with a height less than or equal to 200 $\mu$m located between the diaphragm and at least one electrode.

14. A reactor in accordance with claim 13, wherein the diaphragm forms an insulating layer.

15. A reactor in accordance with claim 13, wherein the diaphragm has a groove, or several grooves, for forming the channel, or channels.

16. A reactor in accordance with claim 13, wherein at least one moderating element is linked thermally to at least one electrode.

17. A reactor in accordance with claim 13, wherein at least one electrode acts as a moderating element.

18. A reactor in accordance with claim 13, wherein said reactor comprises several electrodes which are plate-shaped and essentially parallel.

19. A reactor in accordance with claim 18, wherein one counter-electrode is arranged opposite each of the sides of the plate-shaped electrode.

20. A process comprising the step of: conducting an electrochemical reaction of at least one educt contained in an educt current in a reactor possessing at least one electrode and a counter-electrode, with the electrodes being separated from one another by a capillary gap, wherein the educt current is routed in at least one channel, with a height less than or equal to 200 $\mu$m and a width b less than or equal to 10 mm, serving as a reaction space in the capillary gap and wherein the volumetric flow of the educt current is dimensioned such that flow of the educt current is laminary over the entire length of the channel.

21. A process according to claim 20, wherein the educt current is split up into several component currents, with the component currents being routed in the at least one channel serving as the reaction space with a height less than or equal to 200 $\mu$m and a width b that is less than or equal to 10 mm in the capillary gap and wherein the volumetric flow of the educt current is dimensioned such that each of the component current exhibits laminar flow.

22. A process according to claim 20, wherein a reactor or several reactors is utilized and streams of the educt current are connected in parallel.

23. A process according to claim 20, wherein the educt is a $4^{th}$ place substituted methylbenzene that is oxidized by electrochemical means to a $4^{th}$ place substituted benzaldehyde or benzaldehyde acetal.

24. A process according to claim 23, wherein the educt 4-methoxymethylbenzol that is oxidized to 4-methoxybenzaldehyde with methanol used as a solution and with a potassium fluoride concentration of 0 to 0.1 mol/l.

25. A process according to claim 20, wherein the educt current exhibits no conducting salt.

* * * * *